(12) United States Patent
Lefebvre et al.

(10) Patent No.: US 10,510,177 B2
(45) Date of Patent: *Dec. 17, 2019

(54) DATA PROCESSING DEVICE

(71) Applicants: Inria Institut National De Recherche En Informatiq, Le Chesnay (FR); Universite De Lorraine, Nancy (FR)

(72) Inventors: Sylvain Lefebvre, Velaine-en-Haye (FR); Jeremie Dumas, Fuveau (FR); An Lu, Villers-les-Nancy (FR)

(73) Assignees: Inria Institute National De Recherche En Informatique Et En Automatique, Le Chesnay (FR); Universite De Lorraine, Nancy (FR)

( * ) Notice: Subject to any disclaimer, the term of this patent is extended or adjusted under 35 U.S.C. 154(b) by 59 days.

This patent is subject to a terminal disclaimer.

(21) Appl. No.: 15/738,442

(22) PCT Filed: Jun. 28, 2016

(86) PCT No.: PCT/FR2016/051602
§ 371 (c)(1),
(2) Date: May 14, 2018

(87) PCT Pub. No.: WO2017/001767
PCT Pub. Date: Jan. 5, 2017

(65) Prior Publication Data
US 2018/0268598 A1    Sep. 20, 2018

(30) Foreign Application Priority Data

Jun. 30, 2015   (FR) ...................................... 15 56187

(51) Int. Cl.
*G06T 15/04* (2011.01)
*G06F 17/50* (2006.01)
*G06T 17/00* (2006.01)
*B33Y 50/00* (2015.01)
*B33Y 10/00* (2015.01)

(52) U.S. Cl.
CPC .............. *G06T 15/04* (2013.01); *B33Y 10/00* (2014.12); *B33Y 50/00* (2014.12); *G06F 17/50* (2013.01); *G06F 17/5009* (2013.01); *G06T 17/00* (2013.01); *G06F 2217/12* (2013.01); *Y02P 90/265* (2015.11)

(58) Field of Classification Search
None
See application file for complete search history.

(56) References Cited

U.S. PATENT DOCUMENTS

2001/0005204 A1   6/2001   Matsumoto et al.

OTHER PUBLICATIONS

Lempitsky, et al., "Seamless Mosaicing of Image-Based Texture Maps," Proceedings of IEEE Computer Society Conference on Computer Vision and Pattern Recognition, Jun. 2007, 6 pages.
Dumas, et al., "By-Example Synthesis of Structurally Sound Patterns," ACM Transactions on Graphics, vol. 34, No. 4, Article 137, Aug. 2015, pp. 137:1-137:12.
Gal, et al., "Seamless Montage for Texturing Models," Computer Graphics Forum 29 (2), Jan. 1, 2010, 8 pages.

*Primary Examiner* — Frank S Chen
(74) *Attorney, Agent, or Firm* — Maynard, Cooper & Gale, P.C.; Brian Sattizahn

(57) ABSTRACT

A data processing device applies pattern data to surface data on the basis of projection data, subdividing the surface data into voxels and determining the optimum projection data for each voxel according to its surroundings.

12 Claims, 5 Drawing Sheets

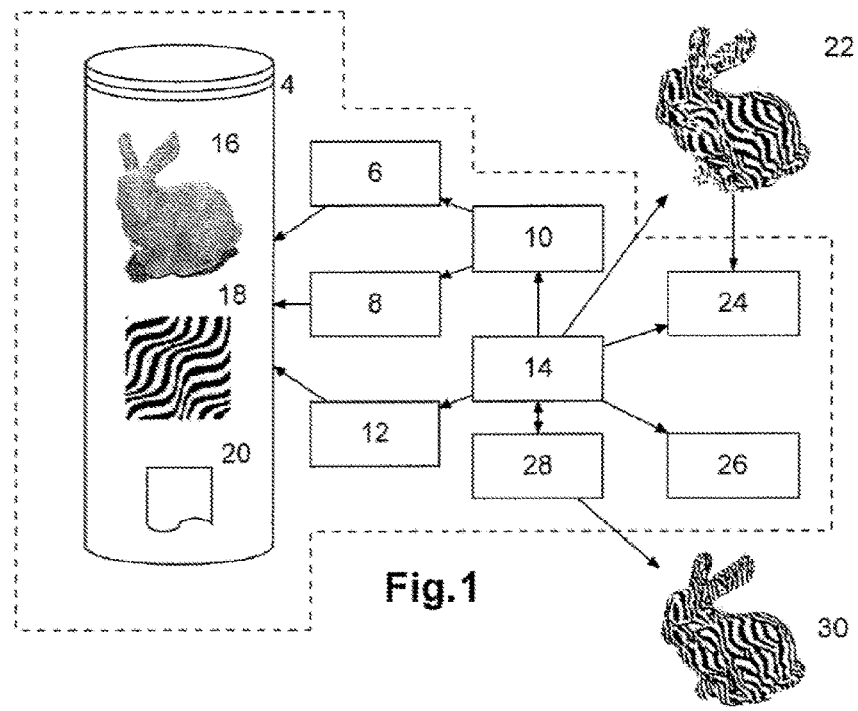
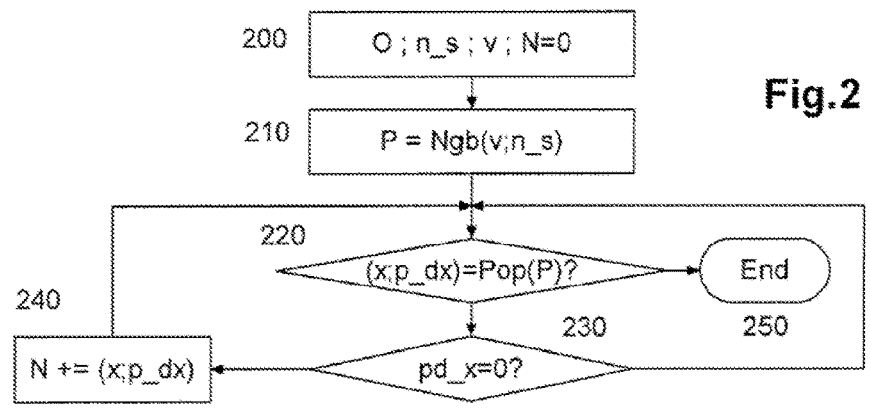
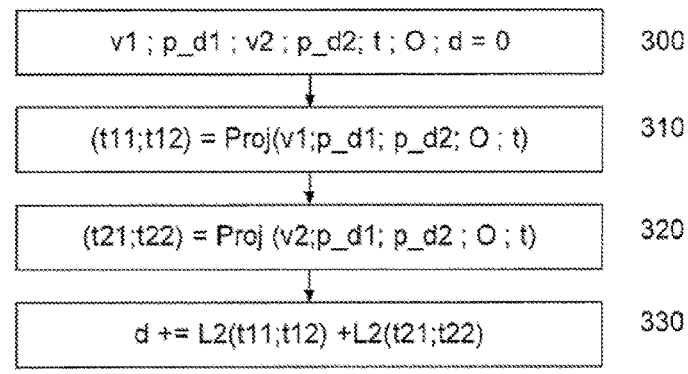

DATA PROCESSING DEVICE

The invention relates to the field of texturizing and in particular to the field of three-dimensional printing.

Applying a texture to an object is a well-developed field. With the increase in available resolutions, there is a new need for improving the quality of applying textures and the time needed, in particular in the case of textures representing a pattern, where irregularities are even more obvious.

These problems are still more apparent in the field of three-dimensional printing. Currently, the possibilities of customizing three-dimensional printed objects are quite limited. Indeed, it is only possible to use a single material for printing, which greatly limits creativity.

The invention will improve the situation. For this purpose, the invention provides a device for processing data, including a memory for receiving three-dimensional surface data, projection data and pattern data, a sorter capable of selecting for one input voxel voxels surrounding the input voxel that correspond to the three-dimensional surface data, an estimator capable of calculating a similarity value between a first voxel associated with first projection data and a second voxel associated with second projection data by calculating the projection of the three-dimensional surface data associated with the first voxel and the three-dimensional surface data associated with the second voxel, respectively on a first surface defined by the first projection data and on a second surface defined by the second projection data on which the pattern data are applied, and by calculating a value derived from the difference between the projection of the first voxel on the first surface and the second surface on the one hand, and the difference between the projection of the second voxel on the first surface and the second surface on the other, a selector capable, for a given voxel and from a set of projection data, of determining those projection data of said set which indicate the best similarity with neighboring voxels of the given voxel, from a value derived from the similarity values obtained by repeatedly calling the estimator with on the one hand the given voxel as the first voxel and projection data of the set as the first projection data and on the other hand with at least some of the voxels derived from calling the sorter with the first voxel as the second voxel, and projection data which are associated therewith as second projection data, and for associating with the given voxel the determined projection data, a propagator capable, from a voxel of a given resolution and projection data which are associated therewith, of defining a plurality of voxels of higher resolution than the given resolution, and for associating with at least some of this plurality of voxels the projection data associated with the voxel of given resolution, a driver arranged for calling the propagator with three-dimensional surface data, a voxel and associated projection data, and for calling the selector with at least some of the resulting plurality of voxels with which projection data are associated as a given voxel, as well as with a set of projection data including on the one hand the projection data associated with the resulting plurality of voxel data, and on the other hand a non-zero quantity of other projection data, the driver further being arranged for repeating the call of the propagator with at least some of the voxels associated with the projection data determined by the selector, as well as the call of the selector on at least some of the resulting plurality of voxels until reaching a chosen resolution.

This device is particularly advantageous since it makes it possible to offer an object of sound mechanical strength, while offering previously unobtainable aesthetic possibilities.

According to the variant embodiments, the device may have one or more of the following features:

the estimator determines the value derived from the difference between the projection of a voxel on the first surface and on the second surface from the difference in texture resulting from applying the pattern data on the first surface and on the second surface for these projections, the estimator further determines the similarity value from a value derived from the value of the angle formed by the normal to the plane defined by the three-dimensional surface data on the one hand, and by the normal to the plane of projection on the other, the similarity value is strictly positive and indicates a similarity that is all the better when the similarity value is low, the propagator associates at least some of the voxels of the plurality of voxels of higher resolution with randomly chosen projection data, the projection data include a surface identifier chosen from a set of planes and transformation data indicating a translation and/or a rotation of the reference frame of the surface designated by the surface identifier for applying the pattern data, the projection data are independent of the three-dimensional surface data, the surface defined by the projection data is a plane, the three-dimensional surface data associated with a given voxel include an average of the normals of a portion of surface associated with the given voxel, and the pattern data are stochastic and repetitive.

Other features and advantages of the invention will better appear on reading the following description, drawn from illustrative and non-restrictive examples, and drawings in which:

FIG. 1 represents a schematic diagram of a device according to the invention,

FIG. 2 represents an example of implementation of a function by the sorter in FIG. 1, FIG. 3 represents an example of implementation of a function by the estimator in FIG. 1

Figure 4:
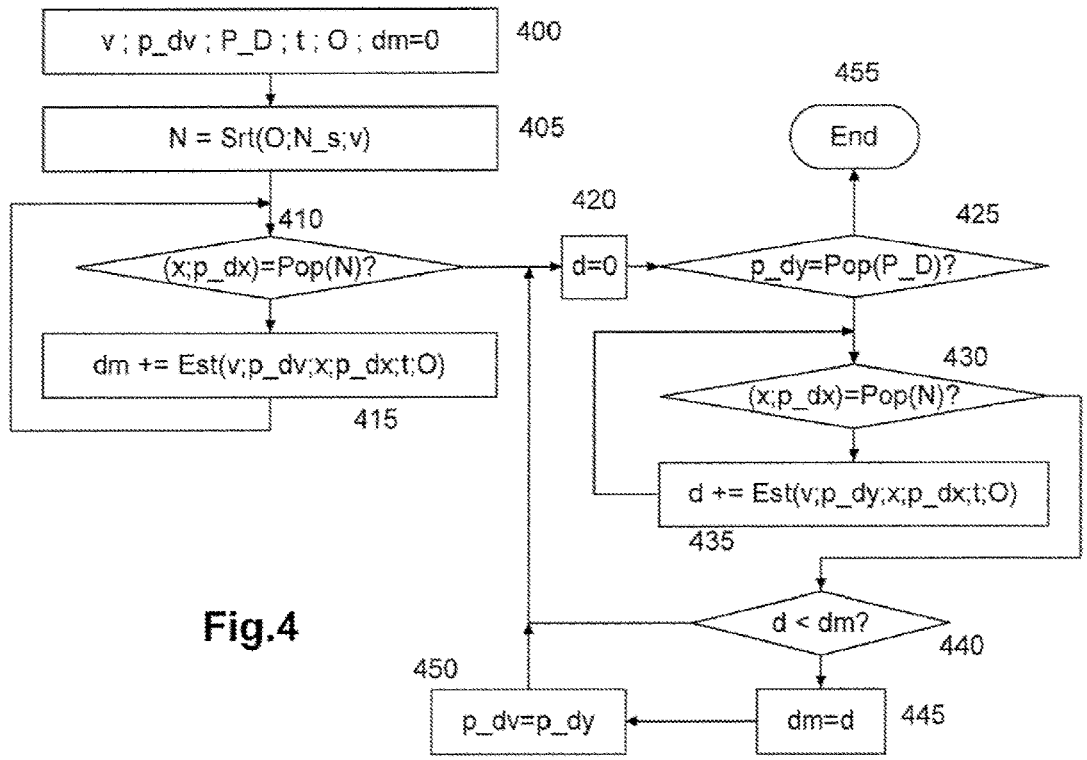
Figure 5:
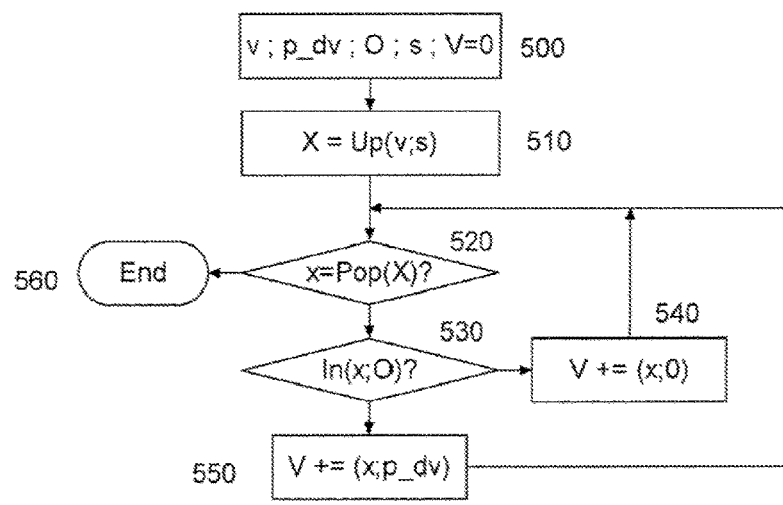
Figure 6:
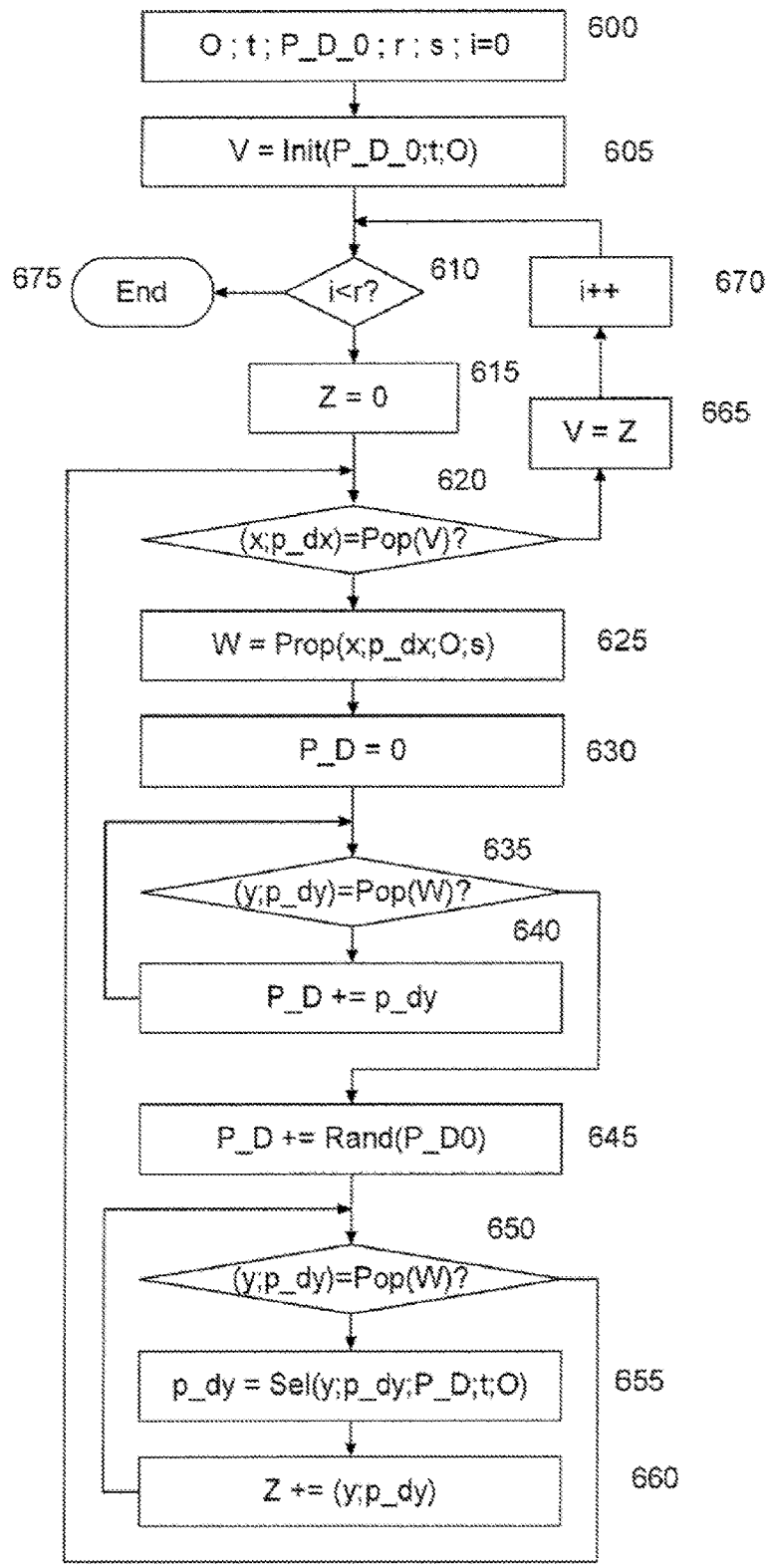
Figure 7:
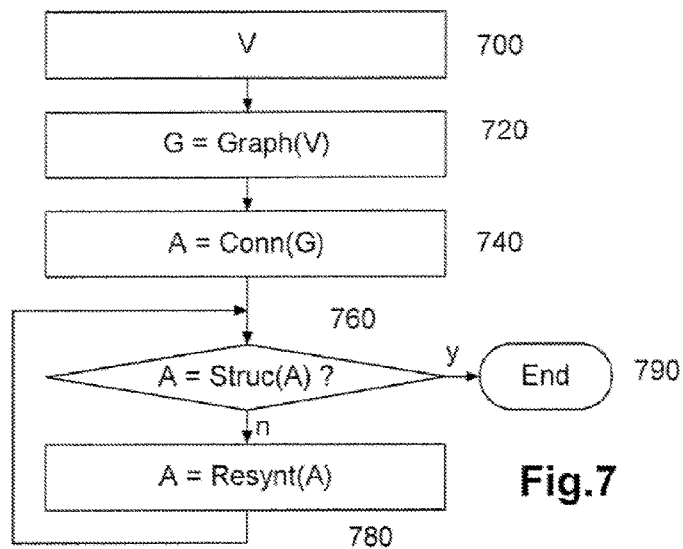
Figure 8:
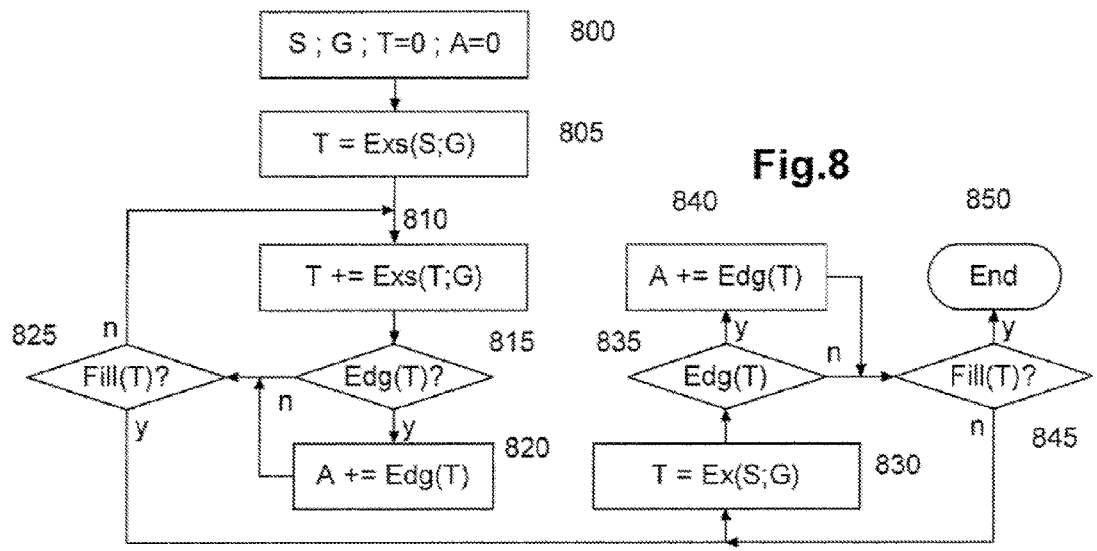
Figure 9:
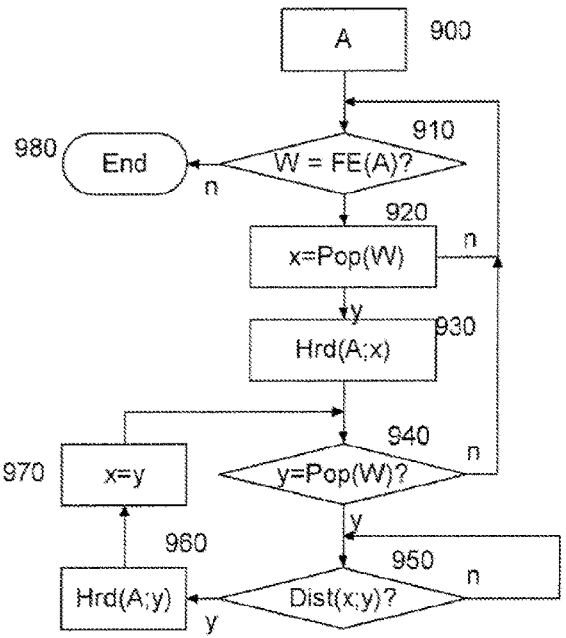
Figure 10:
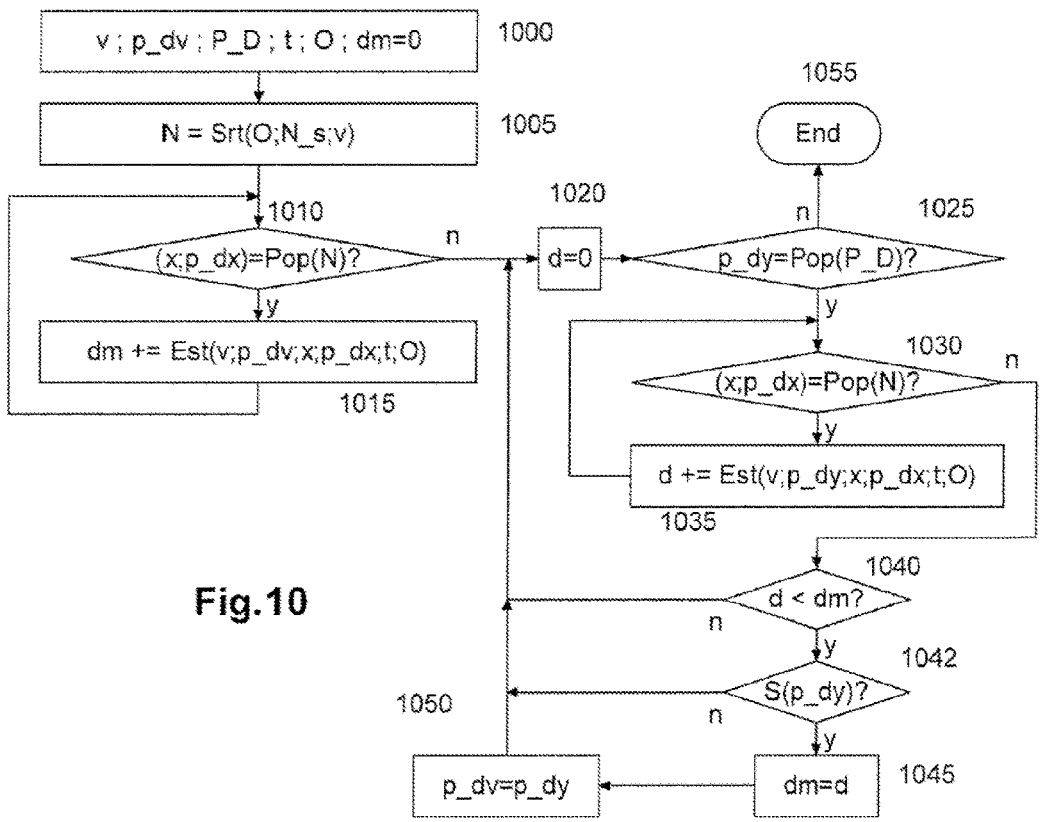

FIG. 4 represents an example of implementation of a function by the selector in FIG. 1, FIG. 5 represents an example of implementation of a function by the propagator in FIG. 1, FIG. 6 represents an example of implementation of a function by the driver in FIG. 1, FIG. 7 represents an example of implementation of the device in FIG. 1, FIG. 8 represents an example of implementation of a function by the extractor in FIG. 1, FIG. 9 represents an example of implementation of a function by the stiffener in FIG. 1, and FIG. 10 represents an example of implementation of a variant of a function by the selector in FIG. 1, in a specific loop.

The following drawings and description basically contain elements of a certain nature. They may therefore not only be used for the better understanding of the present invention, but also contribute to its definition, where appropriate.

The present description may involve elements that are liable to be protected under author's rights and/or copyright. The rights holder has no objection to the faithful reproduction of the present patent document or its description by anyone, as it appears in the official records. For the rest, it reserves its rights in full.

FIG. 1 represents a schematic diagram of a device 2 according to the invention. The device 2 includes a memory 4, a sorter 6, an estimator 8, a selector 10, a propagator 12, a driver 14, a generator 16, an extractor 18, and a stiffener 20.

In the context of the invention, the memory 4 may be any type of data storage appropriate for receiving digital data: hard disk, solid state hard disk (SSD), flash memory in any form, RAM, magnetic disk storage, storage distributed locally or in the cloud, etc. The data calculated by the device may be stored on any type of memory similar to the memory 2, or on the latter. These data may be deleted after the device has performed its tasks or saved.

The data stored in the memory 4 are of multiple kinds. Thus, the memory 4 receives three-dimensional surface data 22, pattern data 24, and working data 26.

The three-dimensional surface data 22 describe the object on which a texture is to be applied. These data may be used directly, i.e. having already been voxelized, or may be raw data. In this case, an element not represented may perform the voxelization. Since voxelization is not the subject matter of the invention, it will be considered in what follows that the three-dimensional surface data 22 have already been voxelized. In the example described here, the three-dimensional surface data 22 contain for each voxel the average of the normals of the surface of the object associated with this voxel. As a variant, the three-dimensional surface data 22 could contain surface data as such, or any other data for describing the portion of the surface of an object that is associated with a voxel. The three-dimensional surface data 22 therefore make it possible to define the object through voxels associated with portions of the surface of the object.

The pattern data 24 represent the pattern to be used for texturing the three-dimensional surface data 22. In the example described here, the aim is to produce a "black and white" pattern, which represents the full and the empty spaces in the three-dimensional object to be printed. For this, the pattern data 24 may directly define a binary pattern. When the pattern data 24 are not binary, they may be specifically processed for this purpose. Finally, in the case where it is not sought to produce a three-dimensional object consisting of empty and full spaces, the pattern data 24 may be colorized in order to texture the object in color, e.g. for multicolor three-dimensional printing. The pattern data 24 may optionally define a relief on the full parts.

The working data 26 include all the data used to perform the data processing according to the invention. These data include the data associating the three-dimensional surface data with the data defining the voxels, projection data, similarity value data and other values described in what follows. In the example described here, the projection data define both a plane of projection (i.e. a pair of non-collinear vectors), and a transformation in this plane.

Thus the pattern data 24 will be transformed in a plane according to the transformation data of this plane for texturing the latter, then the center of the voxel concerned is projected and may receive a texture associated with its projection in the textured plane. It is possible from a limited number of planes (26 in the example described here) and a number of transformations to define a very large number of possible projection planes. Once the projection data are thus defined, it is therefore a matter of choosing the best plane/transformation pairs for each voxel. As a variant, the pattern data 24 may be applied on the portion of the surface data corresponding to the voxel, and this textured surface may be projected onto the plane then transformed according to the transformation data.

In some variants, it is possible to use projection surfaces other than a plane, such as cylinders or spheres, or any other surface that could be advantageous on certain object geometries.

Although the example described here uses planes as a projection surface, it is possible to use other projection surfaces such as cylinders or spheres according to the geometries of the objects.

The sorter 6, the estimator 8, the selector 10, the propagator 12, the driver 14, the generator 16, the extractor 18 and the stiffener 20 are elements directly or indirectly accessing the memory 4. They may be implemented in the form of an appropriate computer code executed on one or more processors. Processors should be understood to mean any processor suitable for calculating texture projection on planes and processing associated with the voxels. Such a processor may be implemented in any known manner, in the form of a microprocessor for a personal computer, a dedicated FPGA or SoC ("system on chip") chip, a computing resource on a grid, a microcontroller, or any other form appropriate for supplying the computing power necessary to the embodiment described below. One or more of these elements may also be implemented in the form of specialized electronic circuits such as an ASIC. A combination of processor and electronic circuits may also be envisaged.

As mentioned above, the invention achieves a good texturization by finding the right plane/transformation pairs to be applied to each element of the three-dimensional surface data (voxels) and to the pattern data. More precisely, the invention applies a method by lowering resolution for determining these pairs.

For this, it is considered that the problem is solved for a given resolution, and it is sought to solve this same problem for a higher resolution, i.e. the grain of which is finer. For this, initially, the result of the given resolution is propagated to the higher resolution, by cutting each of the voxels of the given resolution into voxels of higher resolution, and by applying to these voxels the solution found for the given resolution. Then, the problem is solved by optimizing the plane/transformation pairs thus assigned to the higher resolution. For this, each voxel of the higher resolution is tested with all the known plane/transformation pairs for the given resolution, and a similarity value is determined according to the plane/transformation pairs of the neighbors of this voxel. Finally, each voxel adopts the plane/transformation pair that indicates the best similarity with its neighbors for defining the solution for the higher resolution.

These operations are performed by the sorter 6, the role of which is to select the voxels that are the neighbors of a given voxel, the estimator 8, the role of which is to calculate a similarity value between two voxels and their associated plane/transformation combination, the selector 10 which uses the sorter 6 and the estimator 8 for determining the best plane/transformation combination for a given voxel, the propagator 12 which propagates the solution of a given resolution to a higher resolution, and the driver 14, which selectively activates the selector 10 and the propagator 12 for propagating the result from resolution to resolution, and for calling the selector 10 on the resulting voxels in order to calculate the solution for each higher resolution.

These operations are described in relation to FIGS. 2 through 6.

Once the desired resolution is obtained, the projection of the voxels corresponding to the surface data on the plane/transformation pairs combined with the pattern data 24 produces result data 28.

Then the generator 16, the extractor 18 and the stiffener 20 process the result data 28 in order to make the corresponding physical structure stable from a mechanical point of view.

These operations are described in relation to FIGS. 7 through 9.

As is apparent, the operations of FIGS. 2 through 6 and 7 through 9, although synergistic for supplying a device that starts from surface data and pattern data in order to provide an object to be printed in three dimensions of an original nature, are fairly independent of each other. Thus, FIGS. 2 through 6 describe an original device for producing advantageous applied pattern data, while FIGS. 7 through 9 describe an original device for producing an object to be printed in three dimensions that is mechanically sound.

In the figures described below, a variable the name of which is all in upper-case designates in the majority of cases a list containing multiple elements, while a variable the name of which is in lower-case designates a single element.

FIG. 2 represents an example of a function implemented by the sorter 6 for determining the neighboring voxels of a given voxel. In the example described here, a voxel is said to be a neighbor of another voxel when it is included in a cube the edge of which measures five voxels and the center of which is the other voxel. In other words, if the voxels are defined by coordinates (x; y; z) where x, y and z are multiples of a voxel dimension, two voxels of coordinates (x1; y1; z1) and (x2; y2; z2) are neighbors when x1-x2, y1-y2 and z1-z2 have an absolute value less than or equal to 2. However, only the voxels that correspond to surface data 22 are of interest.

The sorter 6 begins in an operation 200 with three-dimensional surface data O, a neighborhood size variable n_s, an input voxel v and a list of neighbors N initialized to 0 (i.e. empty). As seen above, in the context of the example described here, the neighborhood size variable n_s has a value of 5, for designating a neighborhood in the shape of a cube 5 voxels in length. As a variant, the neighborhood could have a different shape, as well as different dimensions.

In an operation 210, a function Ngb( ) is called with the input voxel v, and the neighborhood size n_s as variables. The function Ngb( ) selects all the voxels that surround the voxel v in a cube of dimension n_s and centered on the voxel v, and stores them together in the list P.

As will be seen later, the voxels that are associated with surface data 22 are associated with projection data 26. In the example described here, the list P receives both the neighboring voxels and the projection data 26 which are associated therewith. As a variant, the match between these voxels and the corresponding projection data is maintained outside of the list P.

The list P contains all the neighbors of the voxel v, including the voxels that do not correspond to the surface data 22. Consequently, nothing is gained by keeping these voxels, since they cannot be used to project the pattern data 24.

For this, a loop is launched in an operation 220, in which the list P is popped in a pair (x;p_dx) which receives the first voxel of the list P and the projection data 26 which are associated therewith. In an operation 230, the projection data p_dx are tested: if they are empty, this means that the voxel x does not correspond to surface data 22, and vice versa. Thus, if the projection data p_dx are present, then the voxel x and its projection data p_dx are entered in the list N in an operation 240. Then, or when the voxel x is not associated with surface data 22, the loop resumes with the operation 220. The loop ends when the list P is emptied, and the list N is returned in an operation 250.

FIG. 3 represents an example of a function implemented by the estimator 8 for calculating a similarity value between a first voxel v1 with which first projection data p_d1 are associated, and a second voxel v2 with which second projection data p_d2 are associated.

The Applicant's work has led to considering that the similarity between two voxels is assessed from the fact that their projections on the planes respectively associated with the first and the second projection data are quite similar.

In other words, if the applied pattern data are projected on the surface data 22 of the first voxel both with the first projection data and with the second projection data, the resulting textures must be similar, and the same applies to the second voxel.

Thus, in an operation 300, the estimator 8 receives a first voxel v1, a second voxel v2, first data projection p_d1, second data projection p_d2, the pattern data t, the three-dimensional surface data O, and a similarity value variable initialized to 0.

In an operation 310, two textures t11 and t12 are calculated by means of a function Proj( ), so that:
the texture t11 receives the texture of the projection of the center of the first voxel v1 on the plane defined by the first projection data p_d1 and textured according to the latter with the pattern data 24, and
the texture t12 receives the texture of the projection of the center of the first voxel v1 on the plane defined by the second projection data p_d2 and textured according to the latter with the pattern data 24.

Then, or in parallel according to the variants, in an operation 320, two textures t21 and t22 are calculated by means of a function Proj( ), so that:
the texture t21 receives the texture of the projection of the center of the second voxel v2 on the plane defined by the first projection data p_d1 and textured according to the latter with the pattern data 24, and
the texture t22 receives the texture of the projection of the center of the second voxel v2 on the plane defined by the second projection data p_d2 and textured according to the latter with the pattern data 24.

Finally, in an operation 330, the returned similarity value d is calculated as the sum of the difference between the textures t11 and t12 on the one hand and between the textures t21 and t22 on the other. In the example described here, the difference between the textures is calculated by means of a function L2( ) that calculates the Euclidean norm of the pixel-by-pixel color difference of the respective textures.

FIG. 4 represents an example of an implementation function by the selector 10 for determining the projection data which are the most suitable for a given voxel taking into account its surroundings.

For this, the selector 10 receives in an operation 400 the voxel v concerned, the projection data p_dv which are associated therewith, a set of projection data that is capable of improving the situation P_D, the pattern data t, the three-dimensional surface data O, and a value of best similarity variable dm initialized to 0.

In a first loop, the similarity between the voxel v and its neighborhood is calculated for the projection data p_dv which are associated therewith. Thus, in an operation 405, the selector 10 calls the sorter 6 which stores the result in a list N.

Then, a loop is performed in which the list N is popped in an operation 410. Then, in an operation 415, the selector 10 calls the estimator 8 with on the one hand the voxel v and its associated projection data p_dv, and on the other hand each popped neighboring voxel x and its associated projection data p_dx. The best similarity variable dm each time receives the similarity value thus calculated.

When the list N is empty, the best similarity variable dm has been initialized with the sum of the similarity values between the given voxel with its associated projection data p_dv and its neighbors with their associated projection data.

Then, the selector 10 initializes another loop in which each of the projection data of the set of projection data P_D will be applied to the given voxel v, for determining whether they constitute a better match with the voxels in the neighborhood of the voxel v and their associated projection data.

For this, a similarity value variable d is initialized to 0 in an operation 420, then the set P_D is popped in an operation 425. Then, the same loop as for the operations 410 and 415 is performed with the operations of popping 430 and calculating the similarity 435 between the given voxel v and the voxels of the neighborhood thereof. However, in the operation 435, the voxel v is not called with the projection data p_dv which are associated therewith, but with the projection data p_dy which have been popped in the operation 425.

Then, in an operation 440, the values d and dm are compared. If d is less than dm, this means that the projection data p_dy, associated with the voxel v, are closer to the voxels in the neighborhood of the voxel v than the projection data p_dv. In this case, the value dm receives the value d as the new best similarity value in an operation 445, and the projection data p_dv receive the projection data p_dy in an operation 450. Thus, the pair dm and p_dv constantly contains the best similarity value between the voxel v and the voxels in its neighborhood, as well as the corresponding projection data. Then, or if d is greater than dm, the popping loop of the set P_D resumes with the operation 420 and the resetting of the variable d. Finally, when the set P_D is empty, the selector 10 returns the projection data p_dv which best match the voxel v taking its neighborhood into account.

Many variants may be directly envisaged, such as performing operations 445 and 450 in parallel, or running similarity value calculation loops in parallel. In addition, some similarity value calculation loops for different projection data p_dy could also be performed in parallel, and the best candidate selected at the end.

Moreover, the Applicant has identified the fact that the similarity value between the given voxel and its neighborhood for given projection data may optionally depend on an additional value, resulting from the angle formed between the normal to the plane defined by the given projection data and the normal to the three-dimensional surface data associated with the given voxel. Indeed, if this angle is large, the projection of the pattern data may be severely distorted, despite a good similarity with the voxels in the neighborhood. Thus, after calculating the similarity with the neighbors, a value derived from the scalar product of the normal to the three-dimensional surface data associated with v with the normal to the plane of the projection data may be added.

The Applicant has also identified the fact that the similarity value between the given voxel and its neighborhood for given projection data may optionally depend on a position in the pattern, for encouraging or discouraging the use of certain portions of the pattern. This may, for example, be used when the pattern is repeated on the plane of projection, for preventing visual discontinuities due to the junctions between the edges of the pattern from appearing on the surface. The voxels that select a projection revealing this portion of the pattern are penalized by an increase in similarity values.

FIG. 5 represents an example of a function implemented by the propagator 12 for propagating the solution of a given resolution to a higher resolution.

In an operation 500, the propagator 12 receives an input voxel v, associated projection data p_dv, three-dimensional surface data O, a resolution sampling size s, and a list of higher resolution voxels V initialized to 0.

In an operation 510, the propagator 12 calls a function Up( ) with the voxel v and the sampling size s. The function Up( ) returns a list X of higher resolution voxels, according to the sampling size s. In the example described here, the sampling size has the value 2, so that the list X contains 8 voxels which together correspond to the voxel v.

Then, the propagator 12 executes a loop in which the voxels in the list X are popped in an operation 520, then tested in an operation 525 for determining whether these voxels correspond to three-dimensional surface data. If this is not the case, then the voxel is stored without associated projection data in the list V in an operation 540. Otherwise, the voxel is stored with the projection data p_dv in the list V in an operation 550. Finally, when the list X is empty, the propagator 12 returns the list V in an operation 560.

As a variant, the operation 550 could introduce noise improving the variety by randomly assigning projection data distinct from the data projection p_dv to at least some of the higher resolution voxels that correspond to three-dimensional surface data. As a variant, the variety is not added randomly, but in a deterministic way.

FIG. 6 represents an example of a function implemented by the driver 14 for calculating the result data 22 from the three-dimensional surface data 22, the pattern data 24 and a set of projection data.

In an operation 600, the driver 14 receives these data as well as the sought resolution level r, the sampling size s and initializes a resolution loop variable of i to 0.

In an operation 605, the driver 14 executes a function Init( ) for starting the operations. The role of this function is to determine the first coarsest resolution voxel that encompasses the three-dimensional surface data, as well as the corresponding projection data. In the example described here, there is only a single first voxel, but there could be a plurality thereof. In addition, the projection data associated with this first voxel are chosen randomly. As a variant, the function Init( ) could calculate these projection data.

Then, the driver 14 initiates a series of loops of index i until the resolution r is reached (operation 610). In each loop, a list Z associating voxels and projection data is initialized to 0 in an operation 615. Then, the list of voxels of a resolution corresponding to the preceding iteration V is popped in an operation 620.

Each voxel x and its projection data p_dx are then propagated by calling the propagator 12 in an operation 625 and the resulting list is stored in a list W. The set of projection data P_D used for running the selector is then initialized to 0 in an operation 630, and a loop scans through the list W with an operation 635 and an operation 640 in order to fill the list P_D with the projection data associated with the voxels in the list W.

Then in an operation 645, a function Rand( ) adds a chosen number of projection data to the list P_D in order to promote the exploration of new solutions. Here again, variety may not be added randomly, but in a deterministic way.

Finally, the list W is scanned by a loop, from an operation 650. The selector 10 is called in an operation 655 with each voxel in the list W in order to find the best projection data p_dy in the list P_D taking its neighborhood into account. The result is stored in the list Z which constitutes the result data 22 for the resolution of the current index i.

When the whole list V has been propagated and optimized, it is updated in an operation 665 with the resulting list Z, which represents the solution for the resolution of index i, then the index i is incremented in an operation 670.

It should be noted that in order to explore all possibilities and to enrich the exploration, the loop of the operations 630 through 660 may be repeated a chosen number of times, or a number of times dependent on a criterion of convergence, in order to ensure that the exploration of new solutions has been performed in an optimal way within each resolution.

When the resolution r is reached, the driver returns the list V containing the result data in an operation 675.

FIG. 7 represents an example of implementation of the device 2 for transforming the data of previously calculated voxels into three-dimensional printable object data.

Indeed, the data produced by the driver 14 are not necessarily structurally "reliable". For example, looking at the result data 22, it appears that the ears of the rabbit, although corresponding to the ideal projection of the pattern data, are not attached to the rest of the body. Under these conditions, it is impossible to print an object. The subject matter of FIGS. 7 through 9 also finds its application in the case where the voxel data are not obtained as described previously.

Thus, the device 2 starts off in an operation 700 of voxel data V. These voxel data describe a rough draft of a three-dimensional object: either the voxel designates a full space, or it designates an empty space.

Then, in an operation 720, the generator 16 transforms the voxel data V into a first graph G.

In the example described here, the graph G is constructed as follows:
each voxel of the voxel data V forms a node,
two voxels are considered as neighbors and connected via an edge if and only if they share a corner,
the weight of the edge in the graph is the length of the edge, defined as the distance between the centers of the two voxels connected via the edge.

The invention provides two methods that can be combined for assessing the mechanical strength of an object corresponding to the voxel data. In both cases, the number of nodes in the first graph G is too large to succeed in calculating anything. In fact, for the additively manufactured object to be aesthetic, there must be a significant number of voxels to obtain a good print resolution, which makes the simulation very complex.

In order to simplify the calculations, in an operation 740, the graph G is "simplified" in a second graph A by means of a function Conn( ). The function Conn( ) is performed by the extractor 18, and FIG. 8 represents an example of implementation of this function.

Prior to that, in the operation 720, the first graph G is Poisson sampled, in order to define a sampled graph S of voxels which each correspond to a full space.

In an operation 800, the extractor 18 starts from the data of the first graph G, the sampled graph S, together with a marker graph T and a second graph A both of which are initialized to 0.

The purpose of the function Conn( ) is to connect all the nodes of the sampled graph S by first edges and second edges. The first edges are "solid" edges, while the second edges are "non-solid" edges. This is done by propagating markers in the marker graph T, starting from the nodes of the sampled graph S.

In an operation 805 the marker graph T is initialized by means of a function Exs( ) which receives the sampled graph S and the first graph G as arguments. The function Exs( ) proceeds by selecting, for each node of the graph S, the nodes of the first graph G with which it shares an edge, and for marking with a marker identifying the respective node of the graph S that one of the selected nodes which designates a full space and the edge of which has the lowest weight. In other words, iterating this process is a matter of propagating the graph S in the solid candidates of the graph G according to a geodesic distance based on the weight of the edges.

The operation 805 may be viewed as an initializing operation. Indeed, after this, two loops will follow one another. The first loop will determine the first edges and the second loop will determine the second edges.

The first loop begins with an operation 810 in which the function Exs( ) is called again to propagate the markers. For this, the marker graph T is used as the argument of the function Exs( ) (instead of the sampled graph S of the operation 805). Thus, it is the nodes that have been marked in the preceding iteration of the loop which are propagated, and the result is reinjected into the marker graph T.

Then, in an operation 815, a function Edg( ) tests the marker graph T to identify whether a solid edge has been detected by the propagation. A solid edge is detected when two different markers are associated with the same voxel of the first graph G. Indeed, this means that this voxel is directly connected via a voxel path designating a solid space between two nodes of the second graph that in turn designate a solid space.

If one or more edges are identified by the function Edg( ), these are introduced into the second graph A in an operation 820. Then, or when no solid edge is detected, a function Fill( ) determines whether all the nodes of the marker graph have been propagated in an operation 825. If it is still possible to propagate markers, the loop resumes in 810.

Otherwise, the second loop begins in an operation 830 with the execution of a function Ex( ) The function Ex( ) is similar to the function Exs( ), except for the fact that the propagation of the markers may take place to all the voxels of the first graph G, and no longer only to those that indicate a full space. The function Ex( ) also differs from the function Exs( ) in that the propagation excludes the voxels associated with a first edge. The rest of the second loop is similar with operations 835, 840 and 845 which are identical to the operations 815, 820 and 825.

When all the markers have been propagated in the second loop, the function Conn( ) ends in an operation 850. It results in a second graph A that contains a set of nodes which correspond to a Poisson sampling of voxels indicating a full space, and which are interconnected via edges which reflect the fact that the paths of voxels between these nodes indicate full or empty spaces.

The extractor 18 could implement the function Conn( ) differently, e.g. by detecting the first edges and the second edges simultaneously, or by using a non-geodesic distance or a distance determined differently.

The stiffener 20 starts from the second graph A and analyzes whether an object corresponding to this graph would be mechanically stable. For this, the stiffener 20 uses two methods that can be used alone or in combination. These methods correspond to two distinct physical simulations which determine whether one or more edges exceed a threshold synonymous with structural rigidity.

The first method is a method based on a finite element simulation and FIG. 9 represents an example of implementation of this method by the stiffener 20. This function analyzes the second "non-solid" edges and redefines some of them as solid edges if necessary to make the object mechanically rigid.

In an operation 900, the stiffener 20 starts from the second graph A. Then, in an operation 910, a loop begins. This loop begins with a finite element simulation of the object defined by the second graph A. This simulation is performed by a function FE( ), which also has access to the mechanical simulation parameters (i.e. the boundary conditions that the printed object must respect for an intended manipulation).

The result of the function FE( ) is a list of second edges W in which the second edges are classified in order of decreasing simulated stress, each of these edges having been determined as having a stress exceeding a stress threshold taking into account the boundary conditions.

This classification by decreasing stress value is important since the principle of the method applied by the stiffener 20 is to make the most stressed edge solid, then the second most stressed edge which is at a given distance from the preceding edge, etc.

Accordingly, in an operation 920, the first edge x of the list W is extracted, and this is made solid by a function Hrd( ) in an operation 930.

Then, in an operation 940, it is tested whether the list W still contains an edge. If this is the case, then the edge corresponding thereto is tested by a function Dist( ) in an operation 950 to determine whether it is at a sufficient distance from the edge x that has just been made solid. If this is not the case, then the operation 940 is repeated until a non-solid edge sufficiently far from the edge x is found in W or the list is empty.

Thus, all the edges are not systematically made solid when they are neighbors, which makes it possible to better respect the original shape of the object of the second graph A.

If such an edge is found, then it is made solid in an operation 960 identical to the operation 930, and in an operation 970, the edge is stored as a preceding edge x for repeating the loop with the operation 940.

When the list W is empty, a new simulation is performed with the operation 910, in order to determine whether the modifications have been sufficient to make the object mechanically rigid.

If the list W is not empty, then the loop is repeated. If the list W is empty, then no non-solid edges have too large a stress value taking into account the boundary conditions, and the function ends with the operation 980, in which all the voxels of the first graph G corresponding to the edges that were made solid are also made solid. In the example described here, the 3 neighbors in the geodesic sense of each voxel of the edge, on each side thereof are also made solid. As a variant, the neighboring voxels that are also made solid could be selected differently (e.g. on a geometrical and non-geodesic criterion), or the neighboring voxels could not be changed.

The second method that the stiffener 20 may apply is a geometrical method. For this, the stiffener 20 scans through each of the non-solid edges of the second graph A and calculates the ratio between the Euclidean distance between the two nodes of each edge and the geodesic distance through the solid edges that separates them. If this ratio exceeds a chosen threshold, then the edge is made solid, as well as optionally the neighbors of the voxels that compose it in the first graph as described above.

As mentioned above, the mechanical method and the geometrical method may be used separately or in combination. The current state of the Applicant's research leads to considering that their combination is particularly advantageous, although it may seem redundant to the person skilled in the art.

Once the stiffener 20 has redefined the non-solid edges, the object may be printed on the basis of the voxels corresponding to the second graph A and the voxels of the first graph G thus modified.

The Applicant has nevertheless identified that this modification of the edges, although mechanically effective, may limit the efficiency of the image processing depicted in FIGS. 2 through 5.

To correct this, the Applicant has discovered that it is possible to execute the stiffener 20 and the image processing function in a loop in order to obtain an optimum visual result while maintaining good mechanical strength.

For this, the Applicant discovered that it was advantageous, after the stiffener 20 has been executed, to recall the image processing on the voxels that have been redefined. For this, the driver 14 again executes the function in FIG. 5, only on the modified voxels for a smaller number of resolutions, and in a slightly different way.

Thus, initially, the driver 14 determines for each modified voxel the list of parent voxels for a chosen number of lower resolutions, i.e. those voxels that the propagator 12 has transformed into these voxels, for a size corresponding to that of the lowest resolution sought.

In the example described here, the chosen number of resolutions is 2, but it could be higher. For example, if the chosen number of resolutions is 2, and the propagator 12 doubles the resolution at each execution (eight times more voxels), then:

the lowest resolution will comprise one voxel,
the intermediate resolution will comprise 8 voxels, and
the resolution that corresponds to the voxels of the second graph A will comprise 64 voxels.

The execution of the driver 14 will be performed from each of the voxels of the lowest resolution which has a child that has been modified by the stiffener 20.

In each resolution, the driver 14 indicates whether a voxel corresponds to a voxel that has been modified. When this is not the case, the selector 10 is executed in the same way. On the other hand, if the voxel in question corresponds to a voxel that has been modified, then the function executed by the selector 10 is slightly modified in accordance with FIG. 10 so as to select as projection data 26 only those data that will also designate a full space. Thus, the execution of the driver 14 will not degrade the mechanical structure, and only visually harmonize the object so that it better matches the pattern data 24.

In FIG. 10, the operations identical to those in FIG. 4 have been represented with an identical numeric suffix, so that the operation 410 and the operation 1010 are identical, etc. As can be seen in this figure, only one operation 1042 has been added, which is a test for determining whether or not projection data p_dy likely to improve the image processing correspond to a solid space.

Once the driver 14 has finished this processing, the generator 16, the extractor 18 and the stiffener 20 are again applied on the resulting voxel data. The loop ends when the stiffener 20 does not modify any edge, and therefore any voxel.

Then, the additive manufacturing operations, including the generation of the support may be performed as is known.

The invention may also be defined as a method of processing data, including the following operations:
a) receiving three-dimensional surface data, associated voxel data, projection data and pattern data,
b) from a voxel of a given resolution and projection data which are associated therewith, defining a plurality of voxels of higher resolution than the given resolution, and associating with at least some of this plurality of voxels the projection data associated with the voxel of given resolution,
c) for at least some of the resulting plurality of voxels with which projection data are associated as a given voxel:
   c1) defining a set of projection data including on the one hand the projection data associated with the resulting plurality of voxel data, and on the other hand a non-zero quantity of other projection data,
   c2) for at least some of the projection data derived from operation c1), and for at least some of the neighboring voxels of the given voxel, and for calculating a similarity value between the given voxel and each neighboring voxel concerned, from the projection of the three-dimensional surface data associated with the given voxel and the three-dimensional surface data associated with the neighboring voxel, respectively on a first surface defined by projection data of the set of projection data and on a second surface defined by the projection data of the neighboring voxel on which the pattern data are applied, by calculating a value derived from the difference between the projection of the given voxel on the first surface and the second surface on the one hand, and the difference between the projection of the neighboring voxel on the first surface and the second surface on the other,
   c3) determining those projection data of said set which indicate the best similarity,
d) repeating operations b) and c) with at least some of the resulting voxels, until reaching a chosen resolution.

This method may have one or more of the following features:
  operation c) includes determining the value derived from the difference between the projection of a voxel on the first surface and on the second surface from the difference in texture resulting from applying the pattern data on the first surface and on the second surface for these projections,
  operation c) includes determining the similarity value from a value derived from the value of the angle formed by the normal to the plane defined by the three-dimensional surface data on the one hand, and by the normal to the plane of projection on the other,
  in operation c), the similarity value is strictly positive and indicates a similarity that is all the better when the similarity value is low,
  operation b) includes associating at least some of the voxels of the plurality of voxels of higher resolution with randomly chosen projection data,
  the projection data include a surface identifier chosen from a set of planes and transformation data indicating a translation and/or a rotation of the reference frame of the surface designated by the surface identifier for applying the pattern data,
  the projection data are independent of the three-dimensional surface data,
  the surface defined by the projection data is a plane,
  the pattern data are stochastic and repetitive.

The invention may also be defined as a computer program product including portions of program code for implementing the device or the method as described above when said program is executed on a computer.

The invention claimed is:

1. A device for processing data, including
  a memory for receiving three-dimensional surface data, projection data and pattern data,
  a sorter configured to select, for one input voxel, voxels surrounding the input voxel that correspond to the three-dimensional surface data,
  an estimator configured to calculate a similarity value between a first voxel associated with first projection data and a second voxel associated with second projection data by calculating the projection of the three-dimensional surface data associated with the first voxel and the three-dimensional surface data associated with the second voxel respectively on a first surface defined by the first projection data and on a second surface defined by the second projection data on which the pattern data are applied, and by calculating a value derived from the difference between the projection of the first voxel on the first surface and the second surface on the one hand, and the difference between the projection of the second voxel on the first surface and the second surface on the other,
  a selector configured to determine, for a given voxel and from a set of projection data, those projection data of said set which indicate the best similarity with neighboring voxels of the given voxel, from a value derived from the similarity values obtained by repeatedly calling the estimator with on the one hand the given voxel as the first voxel and the projection data of the set as the first projection data and on the other hand with at least some of the voxels derived from calling the sorter with the first voxel as the second voxel, and projection data which are associated therewith as second projection data, and to associate with the given voxel the determined projection data,
  a propagator configured to define, from a voxel of a given resolution and projection data which are associated therewith, a plurality of voxels of higher resolution than the given resolution, and to associate with at least some of this plurality of voxels the projection data associated with the voxel of given resolution,
  a driver arranged for calling the propagator with three-dimensional surface data, a voxel and associated projection data, and for calling the selector with at least some of the resulting plurality of voxels with which projection data are associated as a given voxel, as well as with a set of projection data including on the one hand the projection data associated with the resulting plurality of voxel data, and on the other hand a non-zero quantity of other projection data, the driver being further arranged for repeating the call of the propagator with at least some of the voxels associated with the projection data determined by the selector, as well the call of the selector on at least some of the resulting plurality of voxels until reaching a chosen resolution.

2. The device as claimed in claim 1, wherein the estimator is arranged for determining the value derived from the difference between the projection of a voxel on the first surface and on the second surface from the difference in texture resulting from applying the pattern data on the first surface and on the second surface for these projections.

3. The device as claimed in claim 1, wherein the estimator is arranged for determining the similarity value from a value derived from the value of the angle formed by the normal to the plane defined by the three-dimensional surface data on the one hand, and by the normal to the plane of projection on the other.

4. The device as claimed in claim 1, wherein the estimator is arranged for determining a similarity value that is strictly positive and indicating a similarity that is all the better when the similarity value is low.

5. The device as claimed in claim 1, wherein the propagator is arranged for associating at least some of the voxels of the plurality of voxels of higher resolution with randomly chosen projection data.

6. The device as claimed in claim 1, wherein the memory is arranged for receiving projection data which include a surface identifier chosen from a set of surfaces and transformation data indicating a translation and/or a rotation of the surface designated by the surface identifier for applying the pattern data.

7. The device as claimed in claim 1, wherein the memory is arranged for receiving projection data independent of the three-dimensional surface data.

8. The device as claimed in claim 1, wherein the memory is arranged for receiving projection data defining a surface which is a plane.

9. The device as claimed in claim 1, wherein the memory is arranged for receiving three-dimensional surface data associated with a given voxel which include an average of the normals of a portion of surface associated with the given voxel.

10. The device as claimed in claim 1, wherein the memory is arranged for receiving pattern data which are stochastic and repetitive.

11. A method of processing data, including the following operations:
   a) receiving three-dimensional surface data, associated voxel data, projection data and pattern data,
   b) from a voxel of a given resolution and projection data which are associated therewith, defining a plurality of voxels of higher resolution than the given resolution, and associating with at least some of this plurality of voxels the projection data associated with the voxel of given resolution,
   c) for at least some of the resulting plurality of voxels with which projection data are associated as a given voxel:
      c1) defining a set of projection data including on the one hand the projection data associated with the resulting plurality of voxel data, and on the other hand a non-zero quantity of other projection data,
      c2) for at least some of the projection data derived from operation c1), and for at least some of the neighboring voxels of the given voxel, and for calculating a similarity value between the given voxel and each neighboring voxel concerned, from the projection of the three-dimensional surface data associated with the given voxel and the three-dimensional surface data associated with the neighboring voxel, respectively on a first surface defined by projection data of the set of projection data and on a second surface defined by the projection data of the neighboring voxel on which the pattern data are applied, by calculating a value derived from the difference between the projection of the given voxel on the first surface and the second surface on the one hand, and the difference between the projection of the neighboring voxel on the first surface and the second surface on the other,
      c3) determining those projection data of said set which indicate the best similarity,
   d) repeating operations b) and c) with at least some of the resulting voxels, until reaching a chosen resolution.

12. A computer program product including portions of program code for implementing the method as claimed in claim 11 when said program is executed on a computer.

* * * * *